United States Patent [19]

Baumann

[11] 4,127,201
[45] Nov. 28, 1978

[54] COLLAPSIBLE LOADING RAMP OR THE LIKE

[75] Inventor: Emil Baumann, Niederglatt, Switzerland

[73] Assignee: Contraves AG, Zurich, Switzerland

[21] Appl. No.: 741,978

[22] Filed: Nov. 15, 1976

[30] Foreign Application Priority Data

Dec. 12, 1975 [CH] Switzerland ............ 16131/75

[51] Int. Cl.² .................................. B65G 69/28
[52] U.S. Cl. ................................ 214/85; 14/71.3; 14/69.5; 214/85.1
[58] Field of Search ............ 214/85, 85.1; 14/71.1, 14/72.5, 69.5, 71.3; 105/366 R, 436, 368 B

[56] References Cited

U.S. PATENT DOCUMENTS

| | | | |
|---|---|---|---|
| 963,918 | 7/1910 | Miller | 214/85 UX |
| 1,655,686 | 1/1928 | Artas | 214/85 UX |
| 2,611,466 | 9/1952 | Biggert et al. | 214/85 UX |
| 2,900,094 | 8/1959 | Ferguson | 214/85 |
| 3,580,404 | 5/1971 | Mosev | 14/71.1 |
| 3,642,156 | 2/1972 | Stenson | 214/85 |

Primary Examiner—Drayton E. Hoffman
Assistant Examiner—Lawrence E. Williams
Attorney, Agent, or Firm—Werner W. Kleeman

[57] ABSTRACT

A collapsible loading and unloading ramp comprising two substantially parallel spaced longitudinal supports intended to be secured to a vehicle component, for instance a vehicle platform. Each of the longitudinal supports comprises a ramp portion which can be adjusted and locked in position with respect to the plane of the platform and an on-loading portion hingedly connected therewith. The ramp portion comprises three interconnected partial elements, the first partial element provided with a suspension means is hingedly, lockably secured at the second partial element and the second partial element together with the first partial element is secured to be laterally pivotable and fixable at the third partial element. Between both of the longitudinal supports, preferably however only at the region of the third partial element as well as at the on-loading portion, there are provided transverse supports arranged in spaced relationship from one another. The on-loading portion can be fixed in angled relationship to the ramp portion by means of a tension element, such as a chain which can be varied in length.

6 Claims, 4 Drawing Figures

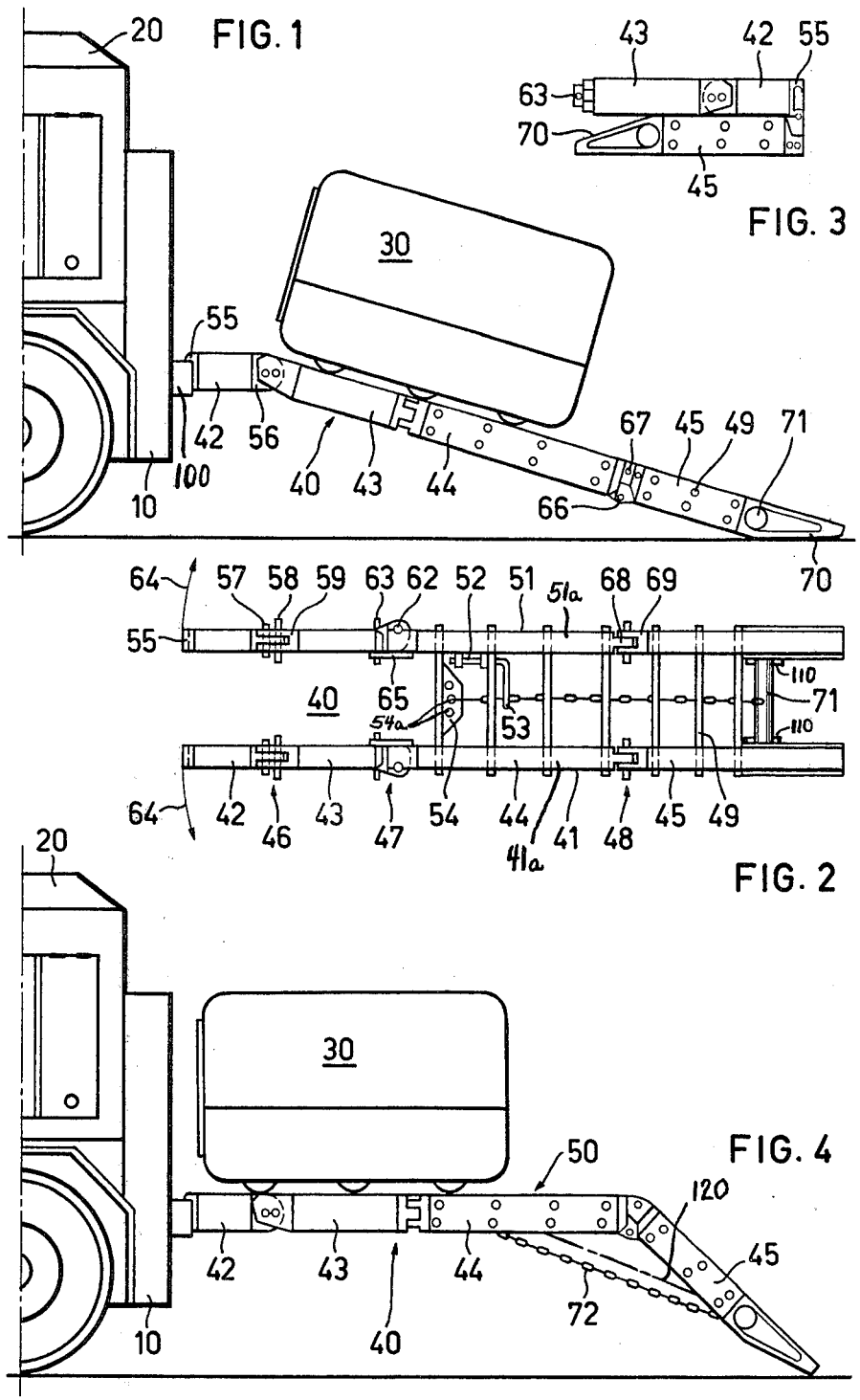

COLLAPSIBLE LOADING RAMP OR THE LIKE

BACKGROUND OF THE INVENTION

The present invention relates to a new and improved construction of a collapsible on-loading and off-loading ramp or the like — hereinafter usually simply referred to as a collapsible loading ramp — comprising two spaced substantially parallel longitudinal supports secured to a vehicle, such as a vehicle platform, each support having a ramp portion which can be adjusted and locked in its adjusted position relative to the plane of the platform and an on-loading portion hingedly connected with the ramp portion.

There is already known to the art a loading bridge or ramp from German patent publication No. 1,243,588 which embodies a bridge or ramp body provided at one side with an angle member and at the other side with a channel-shaped transverse groove. At the ramp body there is hingedly connected an on-loading plate having a cylindrical bead engaging in the transverse groove. This loading ramp serves to bridge the intermediate space between a ramp and a vehicle or between two vehicles. If desired, it also can compensate relatively small elevational differences existing between the parts which are to be bridged, since the on-loading plate hinged and bearing at the vehicle platform can be accommodated as a function of the elevational difference with respect to the bridge portion bearing by means of the angle member upon the ramp.

Additionally, there is also known to the art from German publication No. 606,127 an on-loading ramp for vehicles, especially for rail-bound vehicles, which encompasses an upper ramp having suspension pins and formed by two longitudinal supports interconnected by transverse reinforcement members as well as an on-loading portion likewise formed of two longitudinal supports interconnected by transverse reinforcement members. The upper ramp and the on-loading portion are articulated to one another. Owing to the specially constructed hinge shafts, compensation of track irregularities, both in the horizontal as well as in the vertical direction, is possible for the ramp portions bearing upon the tracks.

According to German Pat. No. 1,243,534, there is disclosed a platform vehicle for the transport of relatively heavy equipment or units, wherein at an end portion of the platform there is provided to both sides a respective ramp portion articulated at a horizontal pivot pin and having an on-loading portion hingedly connected with such ramp portion. The ramp portion and the on-loading portion bearing upon the ground are in alignment with one another in the on-loading position of the unit. Further, at the ramp portion there is pivotably mounted an angle lever at which there is hingedly connected at one side a floor support and at the other side a pressure cylinder mounted at the end portion of the platform. By actuating the pressure cylinder the ramp portion together with the equipment or other load located thereon, is brought from the on-loading position into a position aligned with the platform so that the equipment thereafter can be pushed or driven onto the platform without the need for any complicated additional structure. In the travel position of the vehicle the ramp portion is rocked into an approximately vertical position, whereas the on-loading portion, due to its inherent weight, is rocked about the pivot pin and bears against the ramp portion.

SUMMARY OF THE INVENTION

A primary object of the present invention aims at the provision of a new and improved construction of loading ramp which can be suspended at a device provided for the vehicle so as to assume an on-loading position and for the travel of the vehicle can be collapsed together so as to occupy a minimum of space.

In keeping with the foregoing object, it is another objective of the present invention to provide such type loading ramp which, on the one hand, enables pushing a relatively heavy piece of equipment into a space or compartment provided within the vehicle and, on the other hand, when needed and without having to resort to additional hydraulic or pneumatic auxiliary means, allows converting and fixing the ramp to function as a mounting ramp such that the equipment can be pulled out of the space for maintenance purposes and can be deposited in an approximately horizontal position upon the loading ramp.

Another significant object of the present invention aims at the provision of a new and improved construction of collapsible loading ramp which can be easily mounted at a vehicle in a position to permit on-loading and/or mounting of equipment or other load and, when not needed, can be collapsed together and stowed away into a neat and compact unit not requiring a great deal of space.

Now in order to implement these and still further objects of the invention, which will become more readily apparent as the description proceeds, each ramp portion comprises three interconnected partial elements or members, wherein the first partial element equipped with a suspension means, such as a suspension claw is hingedly fixedly connected at the second partial element. The second partial element together with the first partial element is attached to be laterally pivotable and fixable at the third partial element. Between both of the lengthwise extending or longitudinal supports, preferably however, only at the region of the third partial element, as well as at the on-loading portion, there are provided in spaced relationship from one another transverse supports, and the on-loading portion can be fixed by means of a tension element, such as a chain which is variable in length, in an angled position at the ramp portion.

With the on-loading ramp taught in the aforementioned German patent No. 1,243,534 and consisting of a ramp portion and an on-loading portion and arranged to both sides of a vehicle, the individual ramp portions can be brought into a horizontal position in alignment with the platform, however, the raising of the ramp portion, due to the inherent weight as well as the load located upon the ramp portion, is achieved by means of an additional pressure cylinder, an angle lever, and a floor support.

BRIEF DESCRIPTION OF THE DRAWINGS

The invention will be better understood and objects other than those set forth above will become apparent when consideration is given to the following detailed description thereof. Such description makes references to the annexed drawings wherein:

FIG. 1 is a side view of a loading ramp suspended at the rear end of a vehicle showing a load located thereon in its on-loading or off-loading position;

FIG. 2 is a top plan view of the loading ramp in its extended position;

FIG. 3 is a side view of the collapsed loading ramp; and

FIG. 4 is a side view, similar to the showing of FIG. 1, wherein however the loading ramp and the load located thereon is erected and fixed in its mounted or assembled position.

DETAILED DESCRIPTION OF THE PREFERRED EMBODIMENTS

Describing now the drawings, it will be recognized that reference character 10 designates the end of a vehicle having a vehicle superstructure or body 20 equipped at its chassis end with any suitable not further illustrated device or component, such as a vehicle platform 100, for the suspension of an on-loading and mounting ramp 40, hereinafter simply referred to as a loading ramp. The loading ramp 40 serves to provide an inclined loading surface or plane (FIG. 1) for the on-loading and off-loading of a relatively heavy piece of equipment or device 30 into or out of a not further designated compartment of the vehicle body 20. Further, the loading ramp 40, after appropriately positioning and locking the individual ramp elements or parts, serves as a mounting platform for the piece of equipment 30 retracted out of the vehicle compartment, as best seen by referring to FIG. 4.

The ramp 40 illustrated in top plan view in FIG. 2 essentially consists of two longitudinal or lengthwise extending supports 41 and 51 extending in essentially spaced parallel relationship, each of which is preferably formed of an upright positioned lightmetal-box profile member 41a and 51a, respectively, which are interconnected with one another by transverse supports 49 arranged in spaced relationship from one another. The lengthwise extending or longitudinal supports 41 and 51 are each subdivided into at least two, preferably however as in the illustrated embodiment, a greater number of partial elements or members 42–45, interconnected with one another by appropriately constructed hinge- and arresting means 46–48. The function of the individual partial elements 42–45 with the associated hinge points or hinge means will be described hereinafter. It is here mentioned that the partial elements 42–45 and the hinge means 46–48 of both supports 41 and 45 are partially constructed in mirror-image fashion, otherwise however the same, and therefore have only been provided in each case with one reference character.

Each front partial element 42 is provided at one end with a suspension or attachment means, such as a suspension claw 55 and at the other end with a bracket 56 having a bore for a hinge bolt or pin 57 as well as a further bore for an arresting or locking bolt 58.

The partial element 43 is provided at one end with a bifurcated or fork-shaped hinge element 59 and is hingedly connected by means of the bracket 56 and the bolt 57 with the partial element 42 and arrestably or lockably connected by means of the bolt 58. The parts 56 to 59 form the hinge- and arresting point or means 46.

Both of the partial elements 42, 43 together with the partial element 44 collectively form a support or carrier component or portion 50 which defines a ramp portion and are interconnected by means of the hinge point or hinge means 47. Each hinge means 47 is constructed such that, on the one hand, the partial element 43 together with the partial element 42 is pivotable about a bolt 62 in the direction of each arrow 64 and, on the other hand, as illustrated in FIG. 2, can be locked by means of a further bolt 63 with the partial element 43. A bracket 65 secured to the partial element 44 prevents any pivotal movement opposite to the direction of the relevant arrow 64.

At its other end the partial element 44 is connected with the partial element 45 by means of a hinge point or hinge means 48, and to which end the partial element 44 has a bracket or tongue 68 and the partial element 45 possesses a bifurcated or fork-shaped hinged member 69. The bracket 68 and the hinge member 69 are each equipped with appropriately arranged bores which have not been particularly referenced and articulated by means of a bolt 66 serving as the hinge point and insertable in one set of aligned bores, and lockably connected with one another by means of a further bolt 67 insertable into another set of aligned bores.

The partial element 45 is constructed as an on-loading portion or component and possesses at its rear end a wedge-shaped bevelled portion 70, by means of which the ramp 40 either bears flatly upon the ground, as shown in FIG. 1, or is supported upon the ground as shown in FIG. 4.

The transverse supports 49 arranged between both of the lengthwise extending or longitudinal support 41, 51 are preferably only extended at the region of both partial elements 44, 45 for reasons of strength as illustrated in the exemplary embodiment, through the lengthwise supports, and secured at the outside. However, there is also the possibility of securing the transverse supports 49 at the inside of the lengthwise extending supports 41, 51. When using the ramp 40 as a ladder, the transverse supports 49 serve as step surfaces or rungs.

At the front region, preferably between both of the first two transverse supports 49 of the partial element 44 there is arranged a holder mechanism 52 having a spring-loaded pivotable lever 53. By means of the lever 53 the piece of equipment 30 which has been pulled out of the compartment of the vehicle body 20 can be held in a predetermined position governed by the lever. Since at the region of both front partial elements 42, 43 there are not provided any transverse supports between the lengthwise extending supports 41, 51, the piece of equipment or load 30, especially however a possibly provided motor of such load, is readily accessible from below for maintenance and servicing purposes, but also from each side. Details of a possible construction of load with which the loading ramp of the invention can be beneficially used constitutes subject matter of the commonly assigned, copending U.S. application Ser. No. 741,977 filed Nov. 15, 1976, entitled "Mobile Current Consumer Device".

Between both of the lengthwise extending or longitudinal supports 41, 51 there is attached at the front region of the partial element 44 a plate 54, for instance formed of sheet metal and provided with offset arranged holes 54a. Additionally, there is likewise provided between the lengthwise extending supports 41, 51 at the region of the web-shaped bevelled portion 70 of the partial element 45, a substantially tubular-shaped drum or roll 71 for the reception of a tension element, such as a chain 72 or equivalent structure which is self-winding on the drum 71 in a conventional manner. For instance, the drum 71 may be spring-loaded, as indicated by reference character 110 for winding and tensioning the chain 72. The chain 72 is suspended with its free end in one of the holes 54a arranged in the sheet metal plate 54 so that the carrier or support portion 50 with the partial element 45 remains in the angled position shown in FIG. 4. Moreover the length of the chain 72 is calculated such that the support or carrier portion 50 formed of the partial elements 42, 43, 44, is located preferably in horizontal position when such chain is extended.

According to a schematically illustrated variant embodiment there is, however, the possibility of also providing as the traction element either laterally of both of the lengthwise extending supports a respective rod or between both of the lengthwise extending supports a rod or the like, as indicated by reference character 120 in FIG. 4, by means of which rod or rods it is possible to appropriately position the support portion 50 with respect to the partial element 45. Each such variable length rod 120 may be, for instance, a telescopic structure, or else consist of separate portions connected together by a threaded adjustment mechanism.

Due to the particular arrangement and construction of the hinge means or hinge points as well as owing to the subdivision of the lengthwise extending or longitudinal supports, the ramp 40 can be beneficially employed both as an on-loading and mounting ramp (FIGS. 1 and 4) as well as also in the extended position of the partial elements 42-45 as a ladder. Further, by virtue of the provision of the hinges it can be folded together or collapsed so as to have minimum spatial requirements as shown in FIG. 3, and thus can be suspended and attached at any suitable location at the vehicle body or superstructure.

While there are shown and described present preferred embodiments of the invention, it is to be distinctly understood that the invention is not limited thereto, but may be otherwise variously embodied and practiced within the scope of the following claims.
ACCORDINGLY,

What is claimed is:

1. A collapsible loading ramp comprising:
two lengthwise extending supports arranged in spaced substantially parallel relationship to one another and intended to be secured to a component of a vehicle located in a predetermined plane;
each of the lengthwise extending supports comprising a ramp portion and an on-loading portion;
means for adjustably and lockably positionally securing the ramp portion with respect to the plane containing the vehicle component;
means for hingedly connecting the on-loading portion with said ramp portion;
said ramp portion comprising three interconnected partial elements defining first, second and third partial elements;
said first partial element being provided with suspension means for suspending the ramp portion at said vehicle component;
means for hingedly connecting said first partial element at the second partial element;
means for locking said second partial element together with said first partial element;
means for pivotably securing the first and second partial elements to the third partial element such that, when the loading ramp is disconnected from the vehicle, said first and second partial elements are laterally pivotable together into side-by-side relationship with said third partial element;
transverse supports provided between both of said lengthwise extending supports; and
means for securing said on-loading portion in a selected angular relationship with respect to said ramp portion.

2. The collapsible loading ramp as defined in claim 1, wherein:
said means for securing said on-loading portion in angled relationship with respect to said ramp portion comprises a chain; and
means for winding the chain to alter the length thereof.

3. The collapsible loading ramp as defined in claim 1, wherein:
the transverse supports are arranged only at the region of the third partial element and the on-loading portion.

4. A collapsible loading ramp comprising:
two lengthwise extending supports arranged in spaced substantially parallel relationship to one another and intended to be secured to a component of a vehicle located in a predetermined plane;
each of the lengthwise extending supports comprising a ramp portion and an on-loading portion;
means for adjustably and lockably positionally securing the ramp portion with respect to the plane containing the vehicle component;
means for hingedly connecting the on-loading portion with said ramp portion;
said ramp portion comprising three interconnected partial elements defining first, second and third partial elements;
said first partial element being provided with suspension means for suspending the ramp portion at said vehicle component;
means for hingedly connecting and locking in position said first partial element at the second partial element;
means for securing said second partial element together with said first partial element to be laterally pivotable and fixable at said third partial element;
transverse supports provided between both of said lengthwise extending supports;
means for securing said on-loading portion in angled relationship with respect to said ramp portion;
said means for securing said on-loading portion in angled relationship comprises:
a substantially tubular-shaped drum arranged between the lengthwise extending supports at the on-loading portion;
a self-winding chain secured at said tubular drum and dimensioned such that the extended chain length insures for an approximately horizontal position of the ramp portion with respect to the vehicle component.

5. The collapsible loading ramp as defined in claim 1, wherein:
said vehicle component comprises a vehicle platform.

6. A collapsible loading ramp comprising:
two lengthwise extending supports arranged in spaced substantially parallel relationship to one another and intended to be secured to a device;
each of the lengthwise extending supports comprising a ramp portion and an on-loading portion;
means for securing the ramp portion at the device;
means for displaceably connecting the on-loading portion with said ramp portion;
said ramp portion comprising three interconnected partial elements defining first, second and third partial elements;
said first partial element being provided with means for securing the ramp portion at said device;

means for pivotably connecting said first partial element at the second partial element;
means for locking said first partial element together with said second partial element;
means for pivotably securing said second partial element to the third partial element such that, when said loading ramp is disconnected from said device, said first and second partial elements are laterally pivotable into side-by-side relationship with said third partial element;
transverse supports provided between both of said lengthwise extending supports; and
means including a lengthwise adjustable chain for seucring said on-loading portion in desired angled relationship with respect to said ramp portion.